Patented May 31, 1938

2,118,901

UNITED STATES PATENT OFFICE 2,118,901

MANUFACTURE OF FLUOROHYDRO-CARBONS

Julius Söll, Leverkusen-I. G. Werk, Germany, assignor to I. G. Farbenindustrie Aktiengesellschaft, Frankfort-on-the-Main, Germany No Drawing. Application February 12, 1936, Serial No. 63,657

5 Claims. (Cl. 260—166)

This invention relates to the manufacture of fluoro-hydrocarbons.

The object of my present invention is to cause hydrogen fluoride or an aqueous solution thereof to react upon acetylene in the presence of mercuric compounds and/or active carbons. As mercuric compounds there may be used, for instance, mercuric oxide, chloride or fluoride. In some cases it is preferable not to use the mercury catalysts as such, but to support them upon carriers such, for instance, as activated charcoals which, moreover, have a catalytic effect by themselves. The reaction may be carried out, for instance, by merely passing a gaseous mixture of hydrogen fluoride and acetylene over the catalyst. The reaction sets in at ordinary temperature and is exothermic, so that, owing to the heat liberated, the temperature of the catalyst rises spontaneously, thus accelerating the reaction velocity. Of course, it is also possible to start the reaction at elevated temperatures. Preferably the gases passing over the catalyst are caused to circulate and the resulting fluorinated hydrocarbons are removed from the gases as far as possible on each return of the gases to the reaction vessel. The reaction temperature can be regulated by varying the quantity and the composition of the circulating gases. It is also possible to regulate the temperature by mixing the reaction gases with indifferent gases, the percentage of which, due to the continuous removal of the reaction products, increases during the reaction. The preferred form of my invention is to work at a temperature below about 40° C., more particularly, below about 30° C. The hydrofluoric acid can be employed in form of an aqueous solution or preferably in a water free state.

The reaction products formed depend on the composition of the gas mixture and on the reaction conditions; in case acetylene is employed in excess vinyl fluoride is predominant; in case the hydrofluoric acid is employed in excess the resulting product chiefly consists of difluorethanes. The components can be separated by fractional distillation either at ordinary temperature and increased pressure or at lower temperatures and atmospheric pressure.

The products thus obtained are suitable for various purposes, for instance, they are excellent cooling media for refrigeration machines as they are favorably distinguished from the corresponding chlorine compounds employed for this purpose by their non-poisonous nature. The new products are further particularly valuable for the manufacture of other fluorinated hydrocarbons and polymerization products.

The following example illustrates the invention without, however, restricting it thereto:

Example 1 litre of granulated activated charcoal is stirred with an aqueous suspension of 50 grams of mercuric oxide and dried. The catalyst thus obtained is brought into an iron vessel. A mixture of gases containing acetylene and hydrogen fluoride is then circulated through the catalyst, whereby the temperature is maintained at about 20 to 40° C. The admixture of the hydrogen fluoride may be effected in various ways, for instance by pumping the circulating gases before entering the catalyst through an iron cylinder containing anhydrous hydrogen fluoride at 0° C. A suitable amount of acetylene is admixed before reaching the catalyst, and after leaving it, a corresponding amount of gases is removed, from which the fluorinated hydrocarbons are separated. It is also possible to remove the products directly from the circulating gases, for instance, by means of suitable solvents.

The physical constants of the products in question are the following:

Vinylfluoride

| Temperature | Pressure |
| --- | --- |
| −132.2° C | 10 mm. Hg. |
| −91.1° C | 262.3 mm. Hg. |
| −81° C | 480.3 mm. Hg. |
| −73.7° C | 700.5 mm. Hg. |
| +17° C | 21.2 super atmospheric pressure. |
| −72.2° C | Boiling point, 760 mm. Hg. |

Critical temperature_____°C__ + 47.5
Melting point _____do__ −160.5
Specific gravity+26° C_____ =0.675
Specific gravity−149° C_____ =0.998
Specific gravity−72.2° C_____ =0.853

1,1-difluorethane

| Temperature | Pressure |
| --- | --- |
| −78.8° C | 32 mm. Hg. |
| −37.5° C | 444.7 mm. Hg. |
| −27° C | 755.1 mm. Hg. |
| +21° C | 4.75 super atmospheric pressure. |
| −26° C | Boiling point, 760 mm. Hg. |

Critical temperature_____°C__ +107.5
Melting point _____do__ −117
Specific gravity−78.8° C_____ =1.120
Specific gravity 0°_____ =0.953
Specific gravity+19° C_____ =0.912
Specific gravity−26° C_____ =1.030

In "Handbuch der organischen Chemie" by Beilstein IV edition, volume 1, page 186, a fluorethylene of a boiling point of −51° C. is described. This figure is obviously due to a mistake.

I claim:—

1. The process which comprises causing a mixture of gaseous hydrofluoric acid and acetylene to circulate through a catalyst selected from the group consisting of mercuric oxide and mercuric halides at such a rate as to prevent a rise of the reaction temperature above about 40° C.

2. The process as claimed in claim 1 wherein mercuric fluoride is employed as catalyst.

3. The process as claimed in claim 1 wherein the hydrofluoric acid is employed in a water free state.

4. The process which comprises causing a mixture of gaseous hydrofluoric acid and acetylene to circulate through a catalyst selected from the group consisting of mercuric oxide and mercuric halides precipitated on a carrier, at such a rate as to prevent a rise of the reaction temperature above about 40° C.

5. The process which comprises causing a mixture of gaseous hydrofluoric acid and acetylene to circulate through a catalyst selected from the group consisting of mercuric oxide and mercuric halides, precipitated on active carbon, at such a rate as to prevent a rise of the reaction temperature above about 40° C.

JULIUS SÖLL.